United States Patent [19]
Chen et al.

[11] Patent Number: 5,480,234
[45] Date of Patent: Jan. 2, 1996

[54] JOURNAL BEARING

[75] Inventors: Wen-Jeng Chen; Ronald L. Haugen, both of Mayfield, Ky.

[73] Assignee: Ingersoll-Rand Company, Woodcliff Lake, N.J.

[21] Appl. No.: 421,345

[22] Filed: Apr. 12, 1995

Related U.S. Application Data

[62] Division of Ser. No. 290,454, Aug. 15, 1994.

[51] Int. Cl.$^6$ .................................................... F16C 17/24
[52] U.S. Cl. ........................... 384/313; 384/118; 384/398
[58] Field of Search .................................. 384/313, 398, 384/118, 399, 144, 99, 123, 397

[56] References Cited

U.S. PATENT DOCUMENTS

| | | |
|---|---|---|
| 2,349,690 | 5/1944 | Arms . |
| 2,753,229 | 7/1956 | Queer . |
| 2,901,297 | 8/1959 | Sternlicht . |
| 3,544,180 | 12/1970 | Jones . |
| 3,680,932 | 8/1972 | Raimondi . |
| 4,027,928 | 6/1977 | Williams ................................ 384/397 |
| 4,291,926 | 9/1981 | Tomioka et al. . |
| 4,402,514 | 9/1983 | Ryan et al. .............................. 384/144 |
| 4,427,309 | 1/1984 | Blake . |
| 4,764,084 | 8/1988 | Jesinger ................................ 384/123 |
| 5,145,298 | 9/1992 | Marantette ............................. 384/99 |

*Primary Examiner*—Lenard A. Footland
*Attorney, Agent, or Firm*—John J. Selko

[57] ABSTRACT

An improved journal bearing includes a first groove, in the direction of journal rotation, formed in the inner surface of the journal bearing. The first groove extends axially along the length of the bearing and has opposed, open groove ends. A second groove, in the direction of journal rotation, is formed in the inner surface of the journal bearing. The second groove extends axially along the length of the bearing and has opposed, closed ends. An orifice is provided for supplying a lubricant to the inner surface of the journal bearing. The lubricant supply orifice is disposed substantially centrally along the bearing length and intermediate the first and second grooves.

1 Claim, 2 Drawing Sheets

JOURNAL BEARING

This is a Divisional of application Ser. No. 08/290,454 filed Aug. 15, 1994.

BACKGROUND OF THE INVENTION

This invention generally relates to bearings, and more particularly to a journal bearing for use with rotating machinery.

Typically, journal bearings are used to support radial loads and to suppress vibrations caused by exciting forces acting upon a rotating shaft or journal. These journal bearings are lubricated by introducing a suitable lubricant within the journal bearing, such as through a lubricant supply port. In the design of such journal bearings, it is known to machine or to cast a groove in an inner surface of the journal bearing to provide for leakage of the lubricant from the inner portion of the journal bearing during operation thereof. Such grooves have typically encircled the lubricant supply port such that the lubricant supply port has in the past been disposed in the bottom portion of an individual groove. Such a journal bearing is described in U.S. Pat. No. 2,901,297.

Although these type journal bearings may have operated with varying degrees of success, such journal bearings have experienced high bearing temperatures, bearing varnishing, and lubricant breakdown, which all of course contribute to bearing failure.

The foregoing illustrates limitations known to exist in present journal bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, an improved journal bearing provides for better lubricant mixing between a hot lubricant within the journal bearing and newly supplied lubricant to the journal bearing, which has the effect of reducing bearing temperature and extending bearing life. The improved journal bearing includes a bearing member for rotatably supporting a shaft or journal about an axis of rotation. The bearing member has an inner surface and opposed first and second ends which define a predetermined bearing length dimension. A first groove, in the direction of shaft rotation, is formed in the inner surface of the bearing member. The first groove extends axially along the length of the bearing and has opposed, open groove ends. A second groove, in the direction of shaft rotation, is formed in the inner surface of the bearing member. The second groove extends axially along the length of the bearing and has opposed, closed ends. At least one orifice is provided for supplying a lubricant to the inner surface of the bearing member. The at least one lubricant supply orifice is disposed substantially centrally along the bearing length and intermediate the first and second grooves. The at least one lubricant supply orifice is formed in the inner surface of the bearing member such that lubricant is supplied directly at the inner surface of the bearing member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
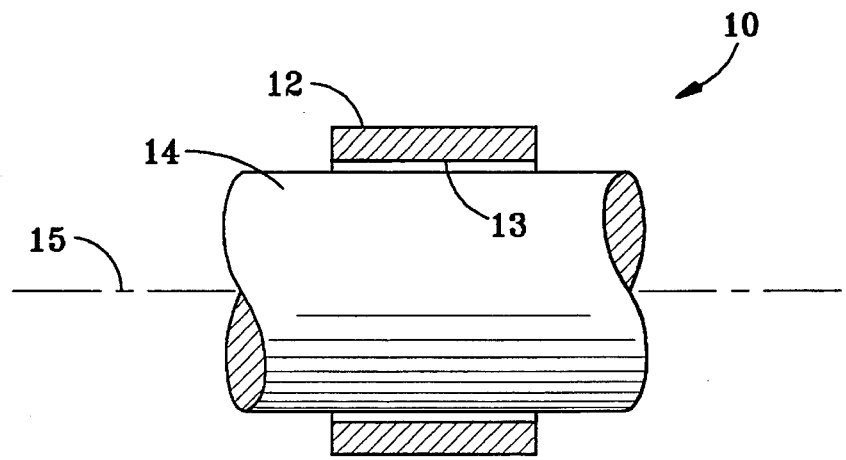
FIG. 1 is a view of a conventional journal rotatably supported by a three lobe journal bearing.

Referring now to the drawings, wherein similar reference characters designate corresponding parts throughout the several views, FIG. 1 illustrates a bearing structure 10 utilized in rotating machinery, such as centrifugal compressors. The bearing structure 10, as illustrated in FIG. 1, comprises a three lobe journal bearing member 12, having an inner bearing surface 13, for supporting a rotatable shaft or journal 14 about an axis of rotation 15. Although a three lobe bearing structure has been illustrated and described herein, it is contemplated that the present invention may be used with any type journal bearing. A bearing housing (not shown) can be made separately or as an integral part of the bearing structure 10. Typically, the three lobe journal bearing member 12 is lined with a liner (not shown) such as babbitt. Bearings of the foregoing type have been used to support radial loads and to provide the necessary dynamic characteristics to suppress any vibrations caused by various exciting forces acting on the shaft or journal 14.

Figure 2A:
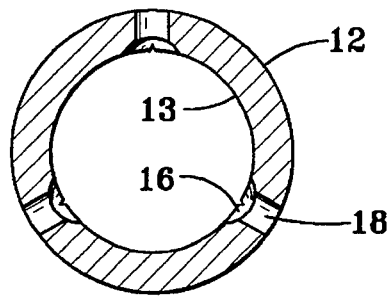
FIG. 2A is an end cross sectional view of the three lobe journal bearing illustrated in FIG. 1.
Figure 2B:
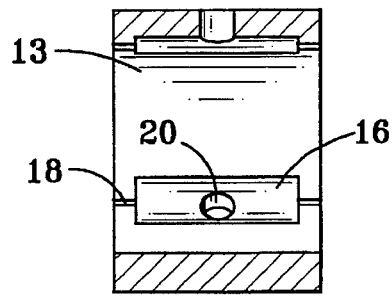
FIG. 2B is a side cross sectional view of the three lobe journal bearing illustrated in FIG. 1.

As illustrated in FIGS. 2A and 2B, the three lobe journal bearing member 12 includes a plurality of lobes which are separated by axial grooves 16. The axial grooves 16 are formed in the inner bearing surface 13 of the journal bearing member 12. The axial grooves 16 may extend across the full length of the bearing, or the length of the grooves 16 may be less than the full length of the journal bearing member 12. Bleed grooves 18, of a reduced width compared to the width of the grooves 16, are provided at the ends of the axial grooves 16. In the past, the dimensions of the grooves 16 and the bleed grooves 18 have been varied to change lubricant end flow, thereby slightly altering bearing operating temperature.

A lubricant, such as a suitable oil, is supplied to the bearing structure 10 through a plurality of openings, orifices or ports 20, which in the past, have been disposed within the axial grooves 16. As may be appreciated by viewing FIGS. 2A and 2B, because of the position of the lubricant supply port within the axial grooves 16, the lubricant supplied through such supply ports 20 is supplied to the journal bearing member 12 at a position well below the inner bearing surface 13. Typically, the lubricant has been supplied to the bearing structure 10 by an external pump (not shown) under moderate pressure, or at ambient pressure by utilizing suitable lubricant transfer devices well known in the art.

Figure 3:
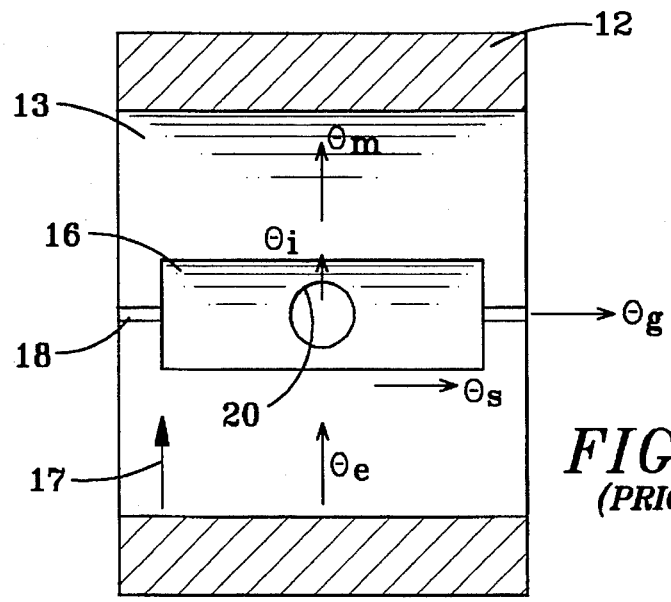
FIG. 3 is a cross sectional view of the three lobe journal bearing illustrated in FIG. 1 taken along a journal axis of rotation, and showing the flow of lubricant throughout the journal bearing during rotation of the journal.

FIG. 3 is a cross sectional view of the prior art three lobe journal bearing 10, of FIGS. 1, 2A and 2B, showing the flow of lubricant throughout the journal bearing during rotation of the journal. As should be understood, during rotation of the shaft 14, the lubricant is supplied through the lubricant supply orifices 20 and into the axial grooves 16. The lubricant is then dragged by the rotating shaft in the direction of the shaft rotation, which is indicated by the arrow 17. Due to the rotational speed and viscosity of various lubricants, hydrodynamic pressure is formed between the inner bearing surface 13 and the journal 14, such that the inner bearing surface 13 and the rotating journal 14 are separated by a rotating layer of hot lubricant. The high hydrodynamic pressure is interrupted by the axial grooves 16. Heat is also generated as a result of friction developed within the bearing structure 10. As the journal 14 continues through a rotation, high temperature lubricant end flow ($\theta_e$) and side flow ($\theta_s$) from a previous lobe enter an axial groove 16 and mix with the new supplied lubricant ($\theta_i$). The mixed lubricant ($\theta_m$) will then enter a next lobe with a small volume of lubricant leaking from the open ends of an axial groove ($\theta_g$). Typically, most of the rotating layer of hot lubricant surrounding the journal 14 will be carried over to the next lobe. It has been discovered that such a journal bearing design creates high temperature lubricant within the bearing structure 10 which causes the lubricant to oxidize quickly thereby shortening the useful lubricant life. Also, it has been discovered that such high bearing temperatures contribute to bearing varnishing, and ultimately, to premature bearing failure.

In accordance with the teachings of the present invention, an improved bearing structure 30 is described in detail hereinafter, and is illustrated in FIGS. 4A, 4B, 5A and 5B.

Figure 4A:
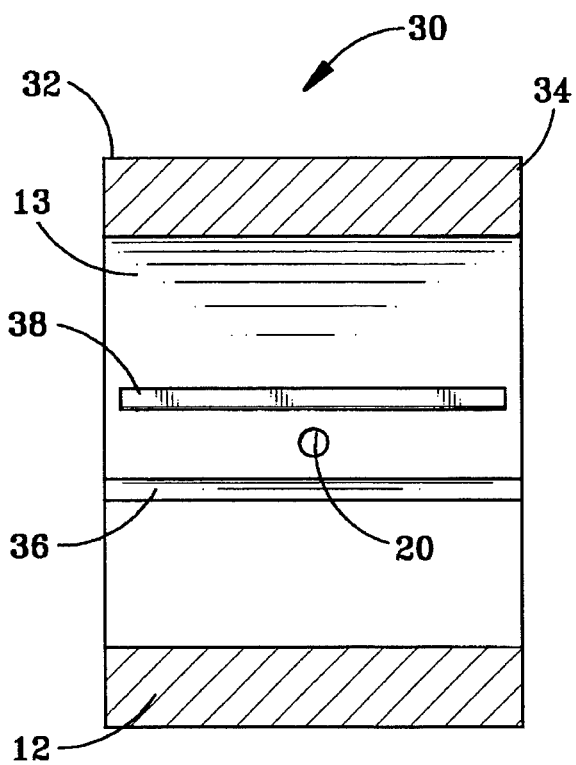
FIG. 4A is a side cross sectional view of an improved three lobe journal bearing in accordance with the teachings of the present invention.
Figure 4B:
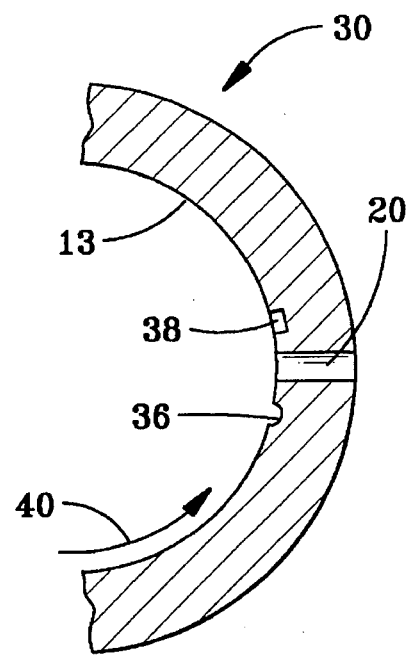
FIG. 4B is an end cross sectional view of the improved three lobe journal bearing of FIG. 4A.

As illustrated in FIGS. 4A and 4B, according to a first embodiment of the improved bearing structure 30, a journal bearing member 12, such as a multi-lobe or three lobe journal bearing member, supports a shaft or journal (not shown) which is rotatable about an axis of rotation (not shown). The journal bearing member has an inner surface 13 and opposed first and second ends 32 and 34, respectively, which define a predetermined bearing length dimension. The journal bearing member 12 includes a means for leaking a predetermined volume of lubricant from an interior portion of the bearing. The lubricant leaking means includes a groove 36 formed in the inner surface 13 of the journal bearing member 12. The groove 36 has opposed open ends and extends axially along the length of the bearing. The ends of the groove 36 may be chamfered, or the groove 36 may extend continuously across the entire length of the journal bearing 12, as illustrated in FIG. 4A.

At least one opening, orifice or port 20 is provided through the journal bearing member 12 for supplying a lubricant, such as a suitable oil, to the inner surface 13 of the journal bearing member 12. In the preferred embodiment, the at least one lubricant supply orifice 20 is disposed substantially centrally along the bearing length and after the groove 36, in the direction of shaft rotation which is indicated by the arrow 40 in FIG. 4B. The at least one lubricant supply orifice 20 is formed in the inner surface of the bearing member such that lubricant is supplied directly at the inner surface 13 of the bearing member.

The journal member 12 also includes a means for mixing a predetermined volume of lubricant. The lubricant mixing means includes a groove 38 formed in the inner surface 13 of the journal bearing member 12. As best seen by reference to FIG. 4B, the groove 38 is disposed at a position after the at least one lubricant supply orifice, in the direction of journal rotation, as indicated by the shaft rotation reference arrow 40. The groove 38 has opposed, closed ends and extends axially along the length of the journal bearing member 12.

As should be understood, in the preferred embodiment, each lobe of a multi-lobe journal bearing is separated by a first groove 36, at least one lubricant supply orifice 20, and a second groove 38.

Figure 5A:
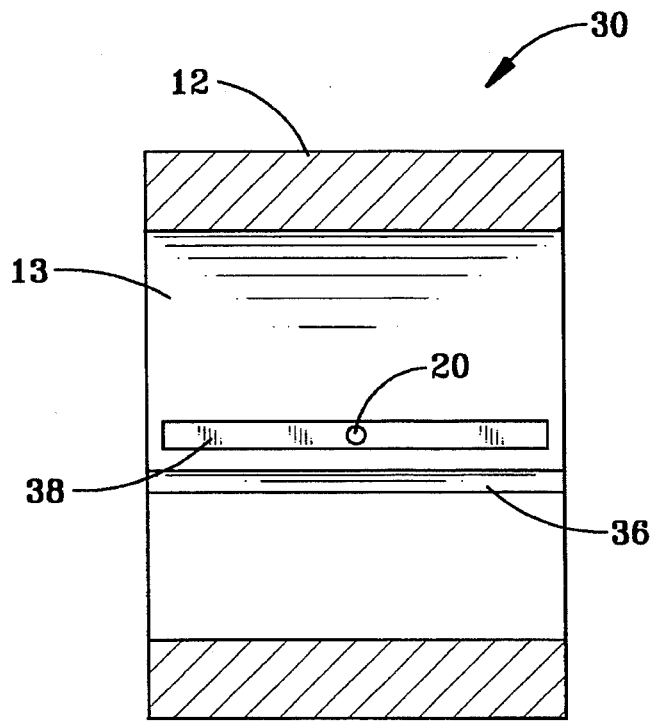
FIG. 5A is a side cross sectional view of an alternate embodiment of an improved three lobe journal bearing in accordance with the teachings of the present invention.
Figure 5B:
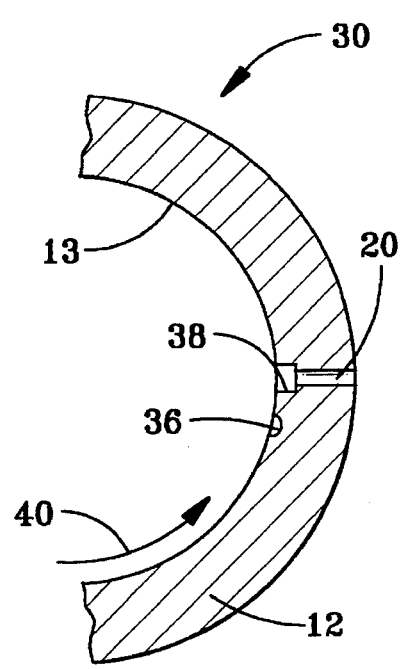
FIG. 5B is a side cross sectional view of the improved three lobe journal bearing of FIG. 5A.

As best seen by reference to FIGS. 5A and 5B, an alternate embodiment of the present invention is provided wherein the means for mixing a volume of lubricant, such as the groove 38, includes at least one lubricant supply orifice 20 which is disposed through the journal bearing member 12, at the bottom of groove 38.

In operation of the embodiment of the present invention illustrated in FIGS. 4A and 4B, lubricant is introduced through the at least one supply orifice 20 directly at the inner surface 13. The introduced lubricant has a substantially lower temperature than the temperature of the rotating layer of hot lubricant within the bearing structure 30. The introduction of cooler lubricant directly at the inner bearing surface 13 has the effect of permitting the introduced lubricant to break into the hot lubricant layer surrounding the rotating shaft surface, thereby reducing hot lubricant carryover from one lobe to the next, as described hereinabove. More particularly, during shaft or journal rotation, most of the hot lubricant is drained from the journal bearing member 12 by action of the groove 36, which is the first groove in the direction of shaft rotation. Thereafter, the damming action caused by the introduction of "cool" lubricant at the inner surface 13 of the journal bearing member 12, at a location just past the first groove 36, but before the second, lubricant mixing groove 38, further causes hot lubricant to leak from the bearing through the groove 36. Hot lubricant which does carry over past the lubricant supply orifice is mixed with the cooler introduced lubricant within the second groove 38. From the foregoing, it is apparent that the present invention is able to lower the working lubricant temperature of the bearing structure 38 thereby improving bearing performance and extending bearing life.

While this invention has been illustrated and described in accordance with a preferred embodiment, it is recognized that variations and changes may be made therein without departing from the invention as set forth in the following claims.

Having described the invention, what is claimed is:

1. In a bearing of the type for supporting a rotatable journal about an axis of rotation, the bearing having an inner surface and opposed first and second ends which define a predetermined bearing length dimension, the improvement comprising: means for leaking a predetermined volume of lubricant from an interior portion of the bearing, the lubricant leaking means including a groove formed in the inner surface of the bearing member, the groove extending continuously, axially along the length of the bearing, from the first end to the second end; and means for mixing a volume of lubricant, the lubricant mixing means including a groove formed in the inner surface of the bearing member at a position after the lubricant leaking means in the direction of journal rotation, the groove having opposed, closed ends and extending axially along the length of the bearing, the lubricant mixing means having formed therein at least one orifice for supplying a lubricant to the interior portion of the bearing, the at least one lubricant supply orifice being disposed substantially centrally within the lubricant mixing means along the bearing length.

* * * * *